2 Sheets--Sheet 1.

R. EICKEMEYER.

Sewing-Machine for Sewing the Sweat-Lining of Hats.

No. 6,311. Reissued March 2, 1875.

Witnesses:
Philip F. Larner
A. B. Cauldwell

Inventor:
Rudolf Eickemeyer,
By Munn & Co.
Attorney

2 Sheets--Sheet 2.

R. EICKEMEYER.

Sewing-Machine for Sewing the Sweat-Lining of Hats.

No. 6,311. Reissued March 2, 1875.

*Witnesses:*
Philip F. Garner
A. B. Cauldwell

*Inventor.*
Rudolf Eickemeyer,
By Wm. C. Wood
Attorney.

UNITED STATES PATENT OFFICE.

RUDOLF EICKEMEYER, OF YONKERS, NEW YORK.

IMPROVEMENT IN SEWING-MACHINES FOR SEWING THE SWEAT-LININGS OF HATS.

Specification forming part of Letters Patent No. 52,698, dated February 20, 1866; reissue No. 6,311, dated March 2, 1875; application filed January 27, 1875.

*To all whom it may concern:*

Be it known that I, RUDOLF EICKEMEYER, of Yonkers, in the county of Westchester and State of New York, have invented a certain new and useful Mechanism by means of which Sweat-Linings may be Sewed into Hats; and that the following, taken in connection with the drawings, is a full, clear, and exact description thereof.

Figure 1:
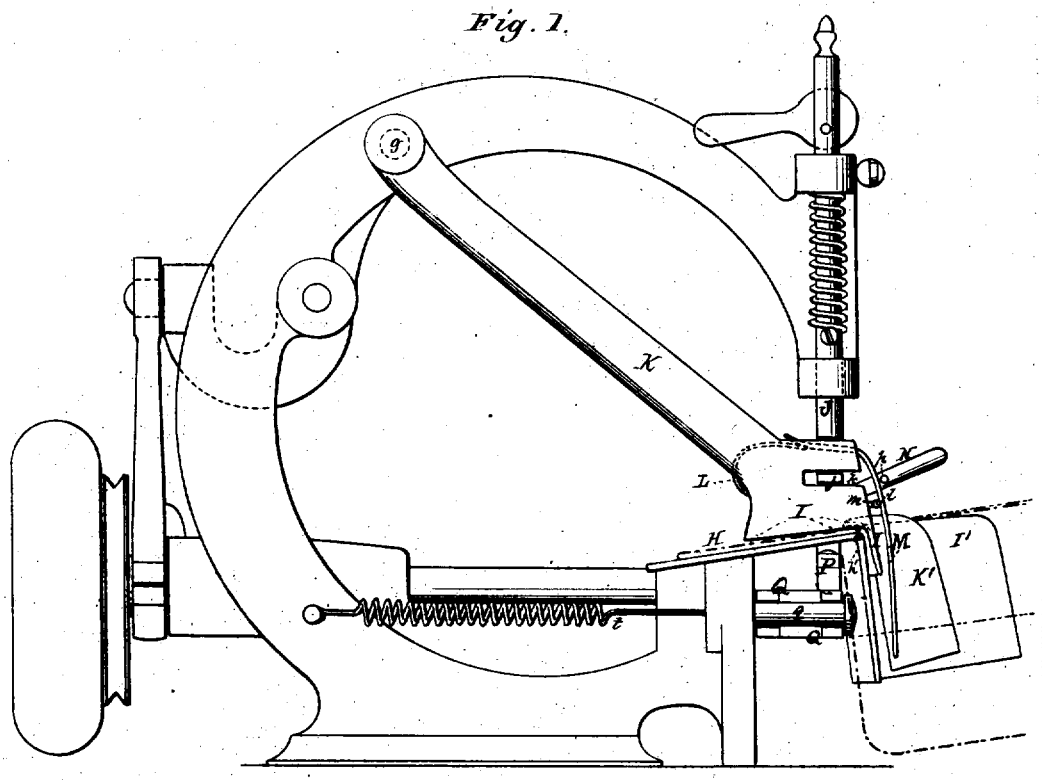
Figure 5:
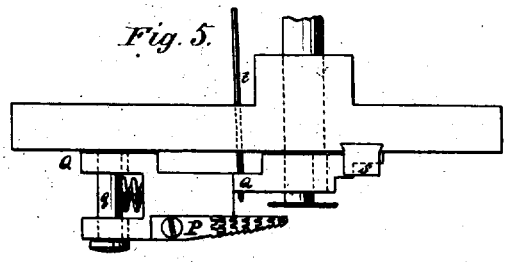
Figure 2:
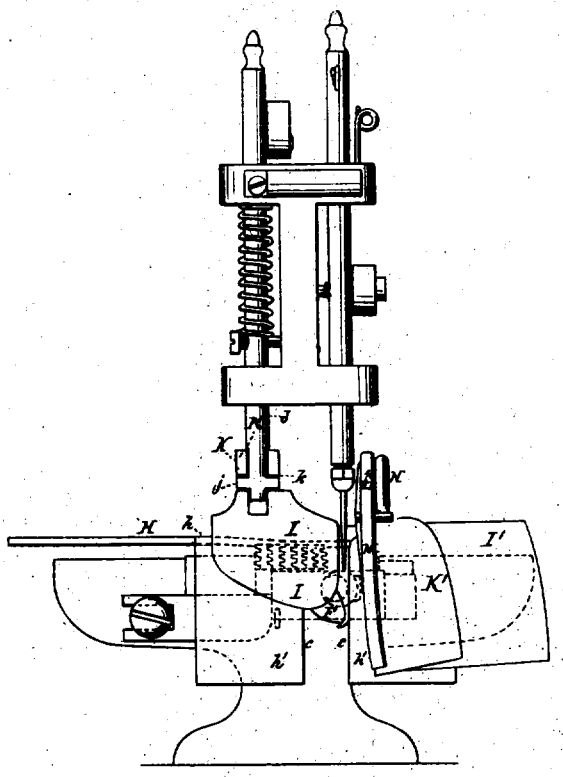
Figure 6:
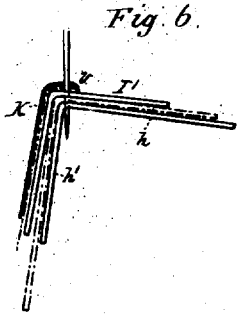
Figure 3:
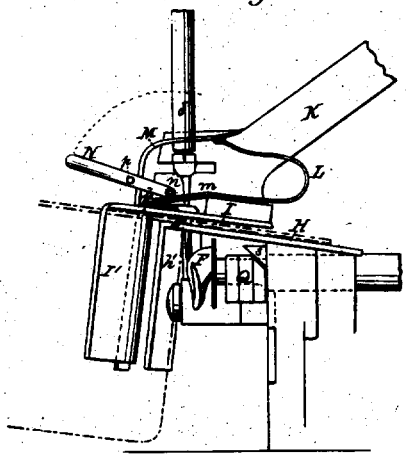
Figure 4:
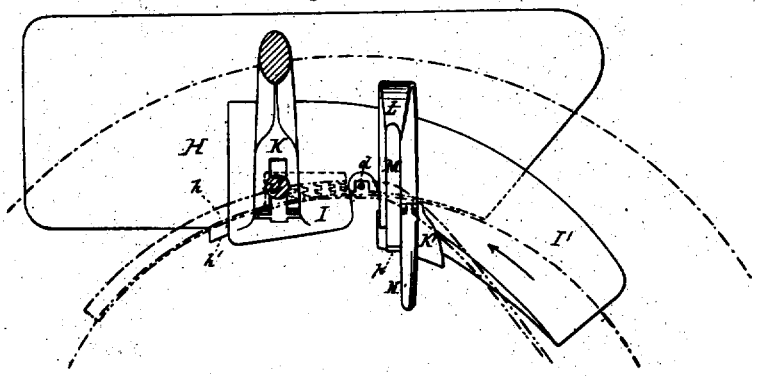

In the drawings, Figure 1 is a side elevation of my mechanism. Fig. 2 is a front elevation thereof. Fig. 3 is a partial side elevation thereof, taken on the side opposite to that represented in Fig. 1. Fig. 4 is a top view or plan of parts thereof. Fig. 5 is a plan of the preferred form of feeding device. Fig. 6 is a transverse vertical section through certain parts of the apparatus.

As my invention consists in mechanism for sewing sweat-linings into hats, a necessary part thereof is mechanism for making a seam, and the mechanism which I prefer for making a seam, and which is shown in the drawings, is that commonly known as the Willcox & Gibbs; but I desire it to be distinctly understood that other kinds of mechanism for making seams may be employed in place thereof, such as the needle-and-shuttle mechanism, or others which produce the interlacing of threads which form stitches.

In sewing on a sweat-lining it is necessary, first, that the seam shall be as near as possible to the junction of the brim with the side crown of the hat, and therefore that the hat shall be supported and guided relatively to the needle, so that the seam shall be in this proper place, and shall throughout its extent be substantially at the same distance from the salient corner formed by the junction of the side crown and brim; second, that the sweat-lining shall be forced to take its proper position in relation to the hat as it is being sewed to the hat.

In order that the operation may be more conveniently performed, and with less attention and manipulation on the part of the operator, it is desirable to support the side crown as well as the brim; to feed the hat in a circular direction by a feeding-surface acting both upon the under side of the brim and the outside of the crown; to press the re-entering corner at the junction of side crown and brim firmly against a corresponding salient corner forming part of the machine; to introduce the hat under the presser-foot by a mouth-piece, and to add to the guide for the sweat-lining an auxiliary guide, which will almost if not entirely relieve the operator from manipulation of this lining after it has been once placed properly in the machine.

An ordinary sewing-machine with an ordinary cloth-plate will not serve my purpose, for the reason that the corner at the side of the hat at the junction of side crown and brim cannot be brought sufficiently near the needle. My first change, therefore, from an ordinary sewing-machine is to make the cloth-plate H to project so slightly in front of the needle (see specially Figs. 4 and 6) that the re-entering corner at the junction of side crown and brim can be brought close up to the needle, and I prefer to make this front edge of the cloth-plate concave in shape. When the edge of the cloth-plate is thus arranged with reference to the needle this edge of the plate forms a guide for the hat, as the edge takes into the corner of the hat at the junction of side crown and brim, and keeps that part of the hat where the seam is being sewed always in a definite position with respect to the needle, so that when the hat is pressed against this front edge of the cloth-plate the seam is always at the same distance from the corner of the hat.

The next thing to provide for is the proper guiding of the piece of leather which forms the sweat-lining, so that its edge shall be always at the same distance from the corner of the hat. In order to effect this I use a guide, against which the edge of the sweat-lining presses, and so long as its edge is kept against this guide, which is near the needle, and always at the same distance from the needle, and acts on the sweat-lining on its way to the needle, the lining must be held in proper relation to the hat. This guide, which controls the edge of the sweat-lining, is shown in the drawings at *v*, Fig. 6; the part which really does the work being the nearly-vertical face of metal against which the edge of the sweat-lining bears, and in the drawing this guide is represented as attached to an extension of the presser-foot.

In order to support the hat more conveniently for the workman, I attach to the edge of the table *h*, and depending therefrom, a curved piece of sheet metal, *h'*, conforming somewhat in shape to the side crown of the hat, and I incline the cloth-plate rearward, and this stationary crown-supporting plate outward at the bottom, and cut a wide slot in the latter, as at *c c*, so as to allow free play of the loop in the formation of a stitch.

An ordinary presser-foot would hold the hat-brim down, and an ordinary four-motion feed, acting on the under side of the brim, would carry it along, so that the needle and revolving looper F would make a seam thereon; but in that case the operator would be obliged to keep the corner of the hat continually pressed against the edge of the cloth-plate, or the junction of the acting surface of the crown-supporting plate with the acting surface of the cloth-plate or table. In order to hold the corner of the hat against its guiding edge or corner, I have therefore contrived a new presser-foot, which is shown at I in the drawings. This presser-foot is not a mere flat plate, as usual, but has in reality two surfaces, the one pressing the brim of the hat down upon the table, the other entering the crown of the hat, and pressing the side crown of the hat against the edge of the table or cloth-plate. This presser-foot is mounted upon an arm, K, pivoted at *g*, so that it rises and falls in lines diagonal both to the table and crown-supporting plate, and is shown in the drawings as held down upon the hats by the rod J of the ordinary presser-foot, which is furnished with a cross-piece, *j*, which fits loosely into a slot, *k*, in a strong piece of metal, to which the plate of sheet metal, which is the presser-foot, is secured. One surface of this presser-foot is also shown in the drawings as curved, so as to correspond with the curvature of the crown-supporting plate, and as having attached to it a piece, I', which never holds the hat either to the table or crown-supporting plate, but serves to guide the hat in under the real presser-foot. This piece I' gradually flares away from the table and the cloth-supporting plate, (see Figs. 1, 2, 3, and 4,) and the needle enters the sweat-cloth between it and the presser-foot proper, as at *d*, Fig. 4. I call this piece I' the mouth of the presser-foot. In order that the feed may be more strong and efficient I cause it to act both on the under side of the brim and the outside of the side crown, and to this end form the feeding-bar with two serrated surfaces, one acting beneath the brim, the other against the side crown, these two surfaces being at nearly right angles to each other. (See Figs. 2, 4, and 5.) This feed-bar P is mounted upon a bar, Q, supported and actuated as usual; but as the feed-bar must act against the side crown, as well as beneath the brim, I make the end of the lever Q a loose fit upon the pin *q*, and apply a stationary inclined plane, *s*, Figs. 3 and 5, also a spring, *t*, which causes the bar Q to bear against this inclined plane. In consequence of this construction the feeding-surfaces and bar, when taking hold of the hat, move diagonally upward, or upward and outward at the same time, instead of vertically upward, as in an ordinary sewing-machine.

The guide which controls the edge of the sweat-cloth, before spoken of, serves all necessary useful purposes; but in order to relieve the operator from attention and manipulation, I have extended it—in fact added to it parts which introduce the sweat-lining so that its edge shall rest against the guide. I call this addition to the guide, which controls the edge of the sweat-lining, the auxiliary sweat-guide. It is shown at K' in the drawings, and is attached to an extension of the presser-foot, and conforms somewhat in shape to the outer surfaces of the mouth of the presser-foot. It is composed of a thin plate of metal, bent so as to present a nearly horizontal surface, and an inclined curved surface, and is elastic, so that its inclined curved surface may be caused to bear against a sweat-lining introduced between it and the outer surface of the mouth-piece of the presser-foot. When a sweat-lining has been introduced between the outer surface of the mouth-piece and the inner surface of the auxiliary sweat-guide, the bent lever M, which is pivoted at *l* to an arm, *m*, secured to an extension of the presser-foot is, by the action of the spring L, caused to force the auxiliary sweat-guide upon the sweat-lining, thus bending it, and, when the machine is working, drawing it by the action of the feed against the guide which controls the edge of the sweat-lining. Another lever, N, which may be raised by hand, and which is pivoted at *n* to the arm *m*, is provided with a stud, *p*. When N is raised the stud *p* is brought over the bend of the lever M, and relieves the auxiliary sweat-guide, so that it springs away from the mouth-piece, at which time a sweat-lining may be introduced.

The mechanism for making stitches may be either the needle and hook of Willcox & Gibbs or other known devices for concatenating a thread or threads.

In the operation of the machine the hat rests with its re-entering corner against the front edge of the table, and with its brim under the sweat-lining, which is, by the action of the presser-foot, pressed down against the upper side of the brim. The edge of the sweat-lining rests on top of the hat-brim and against the guide which controls this edge. As the front edge of the table, the guide which controls the edge of the sweat-lining, and the hole in the table through which the needle passes occupy fixed relative positions, it follows that the seam must at all parts be equally distant from the salient corner of the hat, and that the edge of the sweat-lining must always be equally distant from that same corner. The descending part of the presser-foot jams the re-entering corner of the hat against the edge of the table, and thus relieves the operator from that duty. The depending side-crown support controls the hat more efficiently than the simple edge of the table. The mouth-piece of the presser-foot introduces the hat so that its re-entering corner occupies the proper place, and the auxiliary sweat-guide bends the sweat-lining and introduces it to the guide, which controls its edge. The double-faced feed feeds more strongly than an ordinary feed, and also prevents the side corner from dragging behind the brim, which is a thing that might occur if the hat were fed by a rough surface acting only against the under side of its brim.

I claim as of my own invention—

1. In combination with a mechanism for making stitches, and a presser-foot, a guide for controlling the edge of the sweat-lining, and a cloth-plate, these four elements being constructed and relatively arranged substantially as described, whereby the re-entering corner of the hat formed by the junction of the brim and side crown may be held in proper position with relation to the sweat-lining and the stitching mechanism, to receive stitches through the sweat-lining and the hat, as specified.

2. A stitching mechanism and a feeding mechanism, in combination with a yielding presser-foot having two acting surfaces, and arranged to act substantially as described, whereby the re-entering corner of the hat formed by the junction of the side crown and brim may be held in proper position with relation to the stitching mechanism to receive stitches, as specified.

3. The combination, with a presser-foot having two acting surfaces, of a feed-bar having two serrated acting surfaces, and operating substantially as described.

4. In combination, a yielding presser-foot, a cloth-plate or table, the edge of which is arranged with reference to a needle to form stitches in a hat, as specified, a mechanism for making stitches, and a stationary depending plate, whose surface supports a side crown, as described.

5. In combination with a presser-foot having two pressing-surfaces, a mouth-piece, substantially as described, for guiding the hat to the stitching mechanism.

6. In combination with the yielding presser-foot, a guide which controls the edge of a sweat-lining, and an auxiliary sweat-guide, these two being constructed and operating substantially as described.

7. A presser-foot having two acting surfaces, in combination with a guide which controls the edge of the sweat-lining, and which is arranged relatively to the stitching mechanism, as hereinbefore described, and a depending side-crown support, whereby a hat and a sweat-lining to be sewed therein may be held in proper relative position, as described, the combination of these elements being and acting to form stitches through the hat and the lining, as herein set forth.

RUDOLF EICKEMEYER.

Witnesses:
G. OSTERHELD,
GEORGE NARR.